(12) United States Patent
Parker et al.

(10) Patent No.: US 6,843,061 B2
(45) Date of Patent: Jan. 18, 2005

(54) GAS TURBINE WITH FLEXIBLE COMBUSTION SENSOR CONNECTION

(75) Inventors: David Parker, Oviedo, FL (US); William Richard Ryan, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 8 days.

(21) Appl. No.: 10/315,591

(22) Filed: Dec. 10, 2002

(65) Prior Publication Data

US 2003/0159446 A1 Aug. 28, 2003

Related U.S. Application Data

(60) Provisional application No. 60/357,417, filed on Feb. 15, 2002.

(51) Int. Cl.[7] .................................................. F02G 1/00
(52) U.S. Cl. .............................. 60/772; 60/799; 60/800
(58) Field of Search .......................... 60/772, 799, 800, 60/801, 39.281, 39.24; 73/37; 374/144

(56) References Cited

U.S. PATENT DOCUMENTS

| | | | | |
|---|---|---|---|---|
| 3,572,038 A | * | 3/1971 | Arnett | 60/243 |
| 3,788,143 A | * | 1/1974 | Gabriel | 374/144 |
| 4,011,017 A | * | 3/1977 | Feuerstein et al. | 356/241.6 |
| 4,132,114 A | * | 1/1979 | Shah et al. | 374/179 |
| 4,199,295 A | | 4/1980 | Raffy et al. | |
| 4,244,222 A | * | 1/1981 | Hoyer et al. | 374/138 |
| 4,271,859 A | * | 6/1981 | Lawsing | 137/85 |
| 4,482,091 A | * | 11/1984 | Lawsing | 236/92 R |
| 4,557,106 A | | 12/1985 | Ffowcs Williams et al. | |
| 5,145,355 A | | 9/1992 | Poinsot et al. | |
| 5,185,996 A | * | 2/1993 | Smith et al. | 60/772 |
| 5,197,280 A | | 3/1993 | Carpenter et al. | |
| 5,404,760 A | * | 4/1995 | Robinson et al. | 73/863.11 |
| 5,428,951 A | | 7/1995 | Wilson et al. | |
| 5,544,478 A | | 8/1996 | Shu et al. | |
| 5,575,144 A | | 11/1996 | Brough | |
| 5,706,643 A | | 1/1998 | Snyder et al. | |

* cited by examiner

*Primary Examiner*—Justine R. Yu
*Assistant Examiner*—William H Rodriguez

(57) ABSTRACT

A gas turbine engine (40) having an active combustion control system (54) including a sensor element (44) positioned proximate the combustion chamber (46) as part of a sensor assembly (84) including a spring-action bellows (74). The sensor assembly is installed through an opening (69) in the casing (48) of the engine to make contact with the combustor wall (62). The bellows is compressed from its resting position by tightening mounting bolts (70) against a mounting flange (66) of the sensor assembly. The spring action of the bellows ensures contact between the sensing assembly and the combustor wall in spite of differential thermal growth between the casing and the combustor. The sensor element may be replaced by simply removing the mounting bolts without further disassembly of the engine.

15 Claims, 2 Drawing Sheets

GAS TURBINE WITH FLEXIBLE COMBUSTION SENSOR CONNECTION

This application claims benefit of the Feb. 15, 2002, filing date of provisional U.S. patent application No. 60/357,417.

FIELD OF THE INVENTION

This application relates generally to the field of gas turbine engines and, more particularly, to a gas turbine engine having a sensor for detecting a combustion parameter.

BACKGROUND OF THE INVENTION

It is known to utilize active control of the combustion process in order to achieve stable, efficient, regulation-compliant operation of a gas turbine engine. Active control systems typically include a sensor for detecting a parameter responsive to the combustion process and a control element for controlling the combustion process in response to the measured parameter. One or more such parameters may be measured; for example, the parameter may be the pressure in the combustion chamber, a predetermined wavelength of electromagnetic energy generated by the combustion process, or the exhaust concentration of a particular combustion byproduct such as carbon monoxide.

One such gas turbine with active combustion control is described in U.S. Pat. No. 5,428,951, incorporated by reference herein, wherein a pressure transducer is used to detect combustion-induced pressure oscillations and a flame kernel pulse actuator is controlled in response to the measured pressure oscillations. A flame kernel pulse actuator generates periodic flame kernels that function to suppress the combustion-induced pressure oscillations.

U.S. Pat. No. 4,557,106, incorporated by reference herein, describes an active combustion control system wherein a microphone is used to sense reheat buzz in a gas turbine exhaust stream. The measured sound parameter is used as an input to a vibrating diaphragm that alters the boundary conditions of the combustion and thereby prevents resonance from building. This patent further describes embodiments of the invention wherein the sensor may be a pressure transducer or a photo detector.

In each of the known active combustion control systems, the sensor utilized to measure the combustion control parameter must be positioned proximate the combustion chamber. The exact location and orientation of the sensor may vary from application to application, but there is often a requirement for direct contact between the tip of the sensor and the hot combustion gas. The above-cited patents depict their respective mounting arrangements in schematic fashion and do not teach or suggest the difficulties that may be encountered in securing the sensor in the correct position.

U.S. Pat. No. 5,706,643, incorporated by reference herein, illustrates another active gas turbine control system wherein a pressure probe is illustrated as being mounted to a combustor wall, with a pressure signal being routed to the outside of the engine case by an electrical wire connection. Replacement of such a pressure probe would require the disassembly of the engine case, and the wire connection may be vulnerable to mechanical damage.

U.S. Pat. No. 5,544,478, incorporated by reference herein, illustrates a system that utilizes an optical sensor installed in a combustor wall and extending into a flame shield wall. It is unclear from the patent whether the sensor is free to move in relation to the flame shield wall. If the sensor is designed to move, the alignment of the openings in the respective walls must be held to a close tolerance to ensure free movement of the sensor. If the sensor is not free to move, it may be subject to a high level of stress resulting from the differential thermal growth of the two wall members.

FIG. 1 illustrates a prior art gas turbine engine 10 sold by the assignee of the present invention, Siemens Westinghouse Power Corporation. The engine 10 includes a combustion chamber 12 defined by a combustor wall 14. A burner assembly 16 provides a mixture of fuel and air for combustion in the combustion chamber 12. These components are housed within a casing 18 that forms the pressure boundary of the machine. A pressure transducer 20 is mounted outside the casing 18 for measuring pressure fluctuations within the combustion chamber 12 for use with an active combustion control system. The transducer 20 is installed into a mounting block 22 having a fluid connection to the combustion chamber 12. The fluid connection is established through a hole 24 formed through the "top hat" of the casing 18 to which is connected a communication tube 26. The communication tube extends along the longitudinal length of the burner assembly 16 and is connected, such as by welding, to a port 28 formed on the combustor wall 14. The port 28 is installed in the same axial plane as an end of a pilot cone 30 of the burner assembly 16. A ½ inch weldable Swagelok® fitting 32 is welded to the casing 18 and the mounting block 22 is connected to the fitting 32. A damping tube 34 is connected to the opposed side of the mounting block 22 via a ½ inch Swagelok® union 36 in order to eliminate the acoustic resonance inherent in the length of the communication tube 28. This arrangement has the advantage of keeping the transducer 20 outside of the casing 18, which simplifies replacement of the transducer and avoids exposure of the transducer 20 to the environment inside the engine 10. Furthermore, the communication tube 26 is generally protected from physical damage by the casing 18 and it is sufficiently long in its axial dimension so that it can bend to relax any stresses caused by thermal expansion and contraction of the burner assembly 16. This system permits the pressure internal to the engine 10 to extend beyond the casing 18, and therefore, the pressure boundary created by the mounting block 20, fitting 32, union 36 and damping tube 34 must be properly protected against failure.

SUMMARY OF THE INVENTION

An improved arrangement for mounting a combustion chamber sensor on a gas turbine engine is desired. Such arrangement should provide protection for the sensor and pressure boundary components, should facilitate maintenance of the sensor and engine components, and should avoid excessively strict mechanical alignment criteria.

A gas turbine engine is described herein as including: a casing surrounding a burner assembly for providing a mixture of fuel and air to a combustion chamber defined by a combustor wall disposed within the casing; an active combustion control system comprising a sensor element for controlling combustion in the combustion chamber; a sensor assembly comprising the sensor element and an attached bellows and mounting element; the sensor assembly adapted for insertion of the sensor element through an opening in the casing to position the sensor element proximate an opening in the combustor wall for sensing a parameter in the combustion chamber; wherein the bellows is compressed from a resting state by contact of the sensor assembly with the combustor wall upon tightening the mounting element against the casing. The gas turbine engine may further include: a boss attached to the combustor wall proximate the combustor wall opening, the boss comprising an interior surface defining a tapered opening; the sensor element further comprising a sensor body and a sensor tip protruding from an end of the sensor body opposed the bellows; the sensor body being urged against the interior surface of the boss by spring action of the bellows to position the sensor tip within the tapered opening. The bellows may be selected to have a range of motion sufficient to maintain contact between the sensor assembly and the interior surface of the boss during all operating conditions of the gas turbine engine. A windshield may be attached to the mounting element to extend at least partially around the sensor element. The sensor element may be a pressure sensor, a photo sensor or a gas sensor, among others.

A gas turbine engine is described herein as including: a casing surrounding a burner assembly for providing a mixture of fuel and air to a combustion chamber defined by a combustor wall disposed within the casing; an active combustion control system comprising a sensor element for controlling combustion in the combustion chamber; a sensor assembly comprising the sensor element and an attached bellows and mounting element; the sensor assembly adapted for insertion of the sensor element through an opening in the casing to position the sensor element proximate an opening in the combustor wall for sensing a parameter in the combustion chamber; wherein the bellows is compressed from a resting state by contact of the sensor assembly with the combustor wall upon tightening the mounting element against the casing.

A method of operating a gas turbine engine is describe herein as including: providing an active combustion control system for controlling combustion within a gas turbine engine, the active combustion control system comprising a sensor element for measuring a combustion parameter within the gas turbine engine; providing an opening in a casing of the gas turbine engine; providing an opening in a combustor of the gas turbine engine; providing a sensor assembly comprising the sensor element and a bellows; inserting the sensor assembly through the casing opening to make contact with the combustor so that the sensor element extends proximate the combustor opening; and tightening the sensor assembly against the casing to compress the bellows from a resting state to ensure contact between the sensor assembly and the combustor during operation of the gas turbine engine. The method may further include removing the sensor element from the gas turbine engine by unbolting the sensor assembly from the casing without further disassembly of the gas turbine engine. The method may include selecting the bellows to have a extended length sufficient to ensure contact between the sensor assembly and the combustor during all stages of operation of the gas turbine engine. The method may further include: installing a boss having an interior surface on the combustor to define a tapered combustor opening; and urging the sensor assembly against the interior surface of the boss by bolting a flange of the sensor assembly across the casing opening.

BRIEF DESCRIPTION OF THE DRAWINGS

These and other advantages of the invention will be more apparent from the following description in view of the drawings that show.

DETAILED DESCRIPTION OF THE INVENTION

Figure 1:
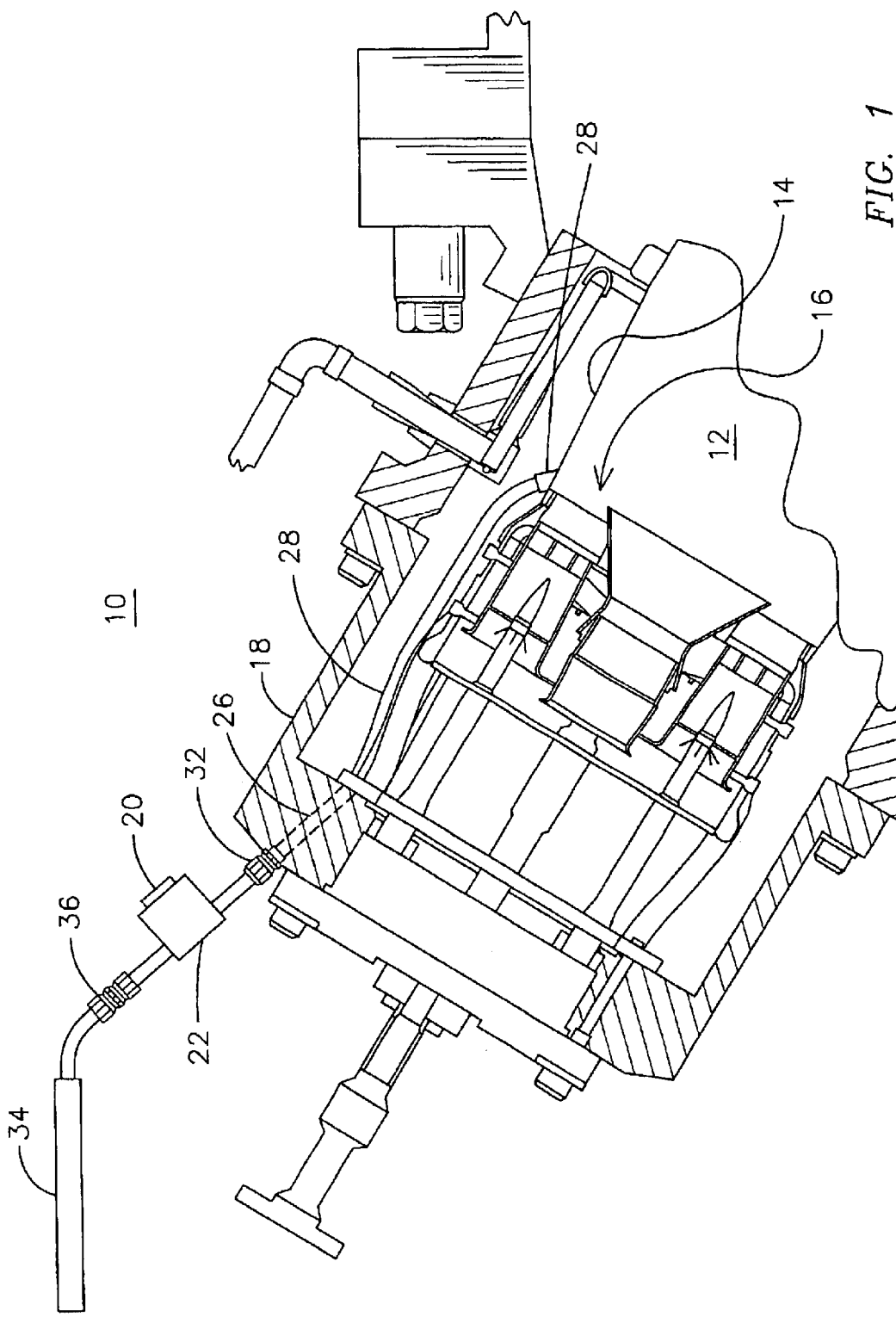
FIG. 1 is a partial cross-sectional view of a prior art gas turbine having a connection for a combustion chamber pressure sensor.
Figure 2:
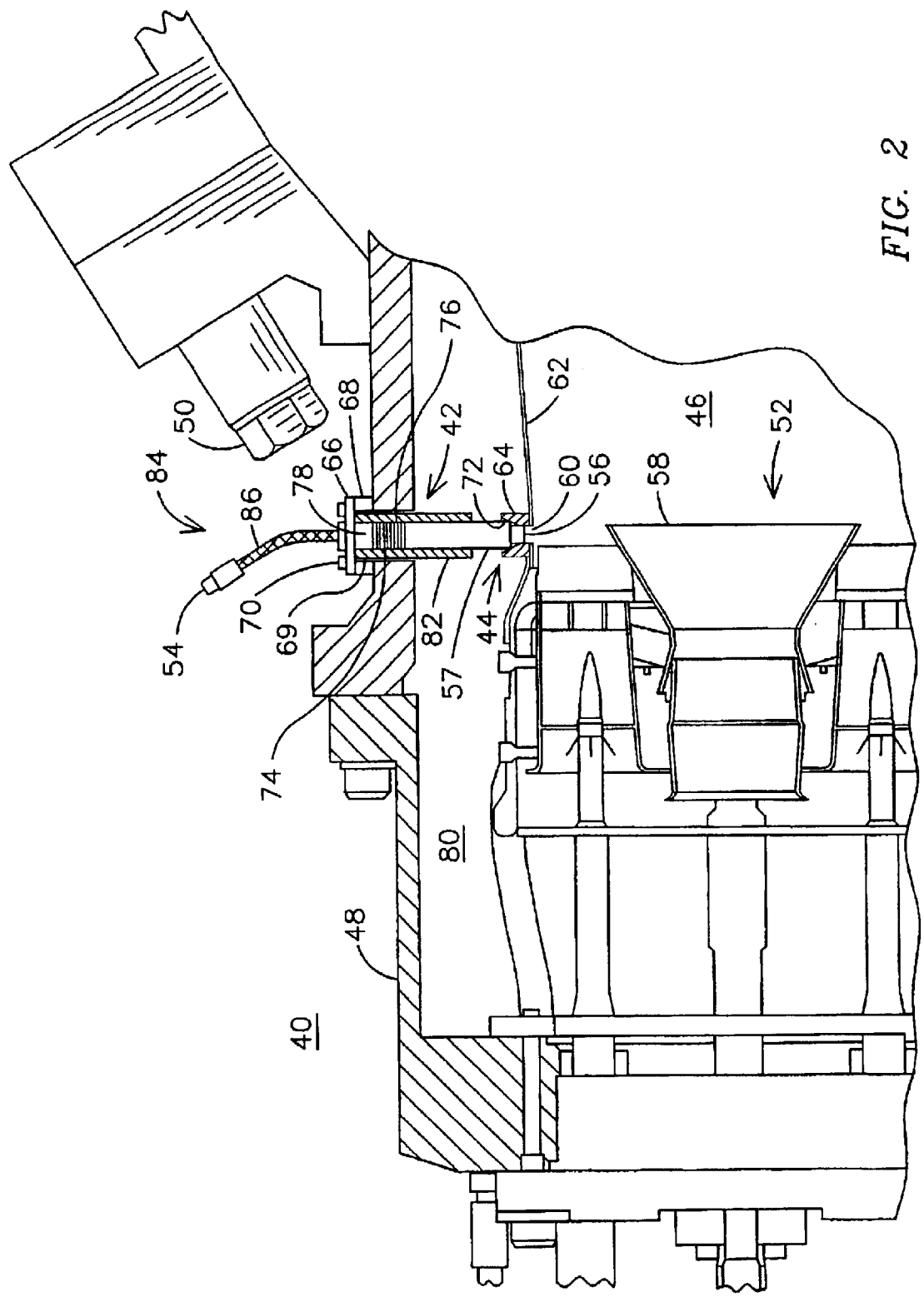
FIG. 2 is a partial cross-sectional view of an improved gas turbine engine having a flexible mounting arrangement for a combustion chamber pressure sensor.

FIG. 2 is a partial cross-section view of an improved gas turbine engine 40 having a flexible mounting arrangement 42 for a sensor element 44 for detecting a parameter responsive to combustion conditions within the combustion chamber 46 of the engine 40. The sensor element 44 in the embodiment of FIG. 2 is a pressure sensor; however, one skilled in the art will recognize that other types of sensors may be used within the confines of the present invention, for example an electromagnetic radiation sensor or photo sensor, a gas sensor, a magnetic sensor, an acoustic sensor, etc.

Gas turbine engine 40 includes a casing 48 that defines a pressure boundary for the engine 40. The casing 48 is formed in sections that are joined together by a plurality of casing bolts 50. A burner assembly 52 supported within the casing 48 provides a mixture of fuel and air to the combustion chamber 46 during operation of the engine 40. Sensor element 44 forms part of an active combustion control system 54 such as any of those systems described in the Background of the Invention or as otherwise known in the art. In the embodiment of FIG. 2 it is desired that a sensing portion or tip 56 of sensor element 44 extend into fluid contact with the combustion chamber at approximately the same axial plane as the pilot cone 58 of the burner assembly 52. In the embodiment of FIG. 2, sensor body element 57 is a metal tubular member that carries mechanical loads and that houses the actual sensor device whose tip 56 extends beyond the sensor body element 57. A pressure sensor element 44 having the ability of operating within the high temperature environment of the interior of the engine 40 is selected for the embodiment of FIG. 2. The actual sensor device may be a pressure-sensing device currently commercially available from Vibro-Meter S.A. (www.vibrometer.com). That device is then welded, brazed or adhesively cemented within body element 57 to form sensor element 44. One may appreciate that other embodiments of sensor elements 44 may include other combinations of load carrying and sensing components.

Sensor element 44 is positioned to have its tip 56 disposed proximate an opening 60 in the combustor wall 62 defined by boss 64. Sensor tip 56 is preferably positioned within 0.75 inches of the inside wall surface of combustor wall 62 in order to avoid the introduction of undesirable acoustic resonance into the system, thereby eliminating the need for the damping tube 34 of the prior art. Boss 64 is joined to the combustor wall 62 by a weld joint. Sensor body element 57 is in contact with boss 64 while sensor tip 56 is positioned proximate and somewhat protruding into opening 60. Boss 64 includes a generally tapered interior surface 72 defining opening 60 for receiving sensor tip 56. Sensor 44 is supported at an opposed end by a mounting element such as sensor mounting flange 66 removeably attached by a plurality of mounting bolts 70 to a sensor port 68 defining an opening 69 through the casing 48. Sensor element 44 makes contact with the boss interior surface 72 but it is not mechanically affixed to that surface 72. Removal of the sensor 44 for maintenance or repair can thus be accomplished without disassembly of the engine 10 by simply removing bolts 70 and sliding sensor element 44 away from casing 48. Furthermore, sensor element 44 is protected from accidental mechanical damage during operation by being positioned within casing 48, and the pressure boundary of the engine 10 is confined by sensor mounting flange 66. In the embodiment of FIG. 2 that is representative of a Model 501F gas turbine engine sold by Siemens Westinghouse Power Corporation, the bolts 70, sensor mounting flange 66, and sensor 44 may be removed to facilitate the removal of casing bolt 50.

A bellows 74 is connected between the sensor element 44/sensor body element 57 and the sensor mounting flange 66. Bellows 74 has a hollow center defined by a flexible wall member 76. The flexible wall member 76 will carry mechanical loads with a predetermined spring constant, thereby accommodating mechanical movement between the sensor body element 57 and the sensor mounting flange 66 with a spring biasing action. Wires or other connections to sensor element 44 pass through the hollow center of bellow 74. Such bellows 74 are commercially available from Senior Flexonics of Rotterdam, Netherlands (www.seniorflexonics.nl) in a variety of materials, sizes and spring constants. Bellows 74 may be joined between sensor body 57 and sensor flange 66 by welding or brazing for example. The bellows 74 may form the pressure boundary or the pressure boundary may be permitted to extend inside the sensor body 57 to the flange 66. One may appreciate that when various mechanical components are described herein as being attached, connected or joined to each, such terminology is meant to include both direct attachment and attachment through an intermediate component. For example, an intermediate body element 78 may be used between bellows 74 and flange 66 as necessary. Bellows 74 provides three-dimensional flexibility to accommodate misalignment and thermal expansion between the boss 64 and sensor flange 66. The size and available range of movement of the bellows 74 selected for a particular application is predetermined to accommodate a desired degree of misalignment and thermal expansion. Differential thermal growth may create relative movement of approximately ±¼ inch (±0.6 cm) for the model 501F gas turbine. In one embodiment, bellows 74 is compressed from its resting state, i.e. its normal length in the absence of any external compressive loads, by tightening flange 66 against casing sensor port 68 to accommodate the installation of the sensor element 44 into the engine 10 during cold shutdown conditions. Sensor body element 57 is biased against the combustor wall 62/boss 64 by the spring action of the bellows 74. In this manner, differential thermal expansion that results in an increase in the distance between the boss 64 and sensor flange 68 is accommodated while maintaining mechanical contact between the sensor element 44 and the boss 64, thereby minimizing the leakage of air into the combustion chamber 46 from the surrounding annulus region 80. The compressed state of bellows 74, i.e. shorter length than its resting state, also beneficially affects the natural frequency of the system and dampens flow-induced vibration generated by the passage of the incoming combustion air over sensor body element 57. An optional windshield 82 (shown in a partial sectional view) extending at least partially around the sensor element 44 provides additional protection against flow-induced vibration. Windshield 82 is illustrated in FIG. 2 as being partially cut away to reveal the sensor body 57 and bellows 74 contained therein. Windshield 82 may be a hollow metal tube that is welded to the sensor mounting flange 66 after the bellows 74 and sensor body 57 are welded thereto.

Inspection, repair and replacement of the sensor element 44 is accomplished by removing bolts 70 and simply removing the entire sensor assembly 84 including the sensor element 44, the bellow 74, the intermediate body element 78, the flange 66 and associated sensor cabling 86. Replacement of the sensor can be accomplished without further disassembly of the engine 40 during any engine shutdown period.

While the preferred embodiments of the present invention have been shown and described herein, it will be obvious that such embodiments are provided by way of example only. Numerous variations, changes and substitutions will occur to those of skill in the art without departing from the invention herein. One skilled in the art may envision other embodiments of the present invention wherein other types of sensors are installed in other locations within a gas turbine engine. Furthermore, the relative locations of the sensor flange 66, intermediate body element 78, bellows 74 and sensor element 44 may be changed to accommodate a particular application. Accordingly, it is intended that the invention be limited only by the spirit and scope of the appended claims.

What is claimed is:

1. A gas turbine engine comprising:

a casing;

an opening formed through the casing;

a combustor wall disposed within the casing;

an opening formed through the combustor wall; and a sensor assembly comprising a mounting flange, a bellows connected to the mounting flange, and a sensor element, the mounting flange being removeably attached to the casing across the casing opening to position the sensor element proximate the combustor wall opening, wherein the sensor assembly is urged against the combustor wall to compress the bellows from a resting state to a compressed state at cold shut-down condition of the gas turbine engine when the mounting flange is in an installed position across the casing opening.

2. A gas turbine engine comprising:

a casing;

an opening formed through the casing;

a combustor wall disposed within the casing;

an opening formed through the combustor wall; and a sensor assembly comprising a mounting flange, a bellows connected to the mounting flange, and a sensor element, the mounting flange being removeably attached to the casing across the casing opening to position the sensor element proximate the combustor wall opening;

a boss attached to the combustor wall proximate the combustor wall opening, the boss comprising an interior surface defining a tapered opening;

the sensor element further comprising a sensor body and a sensor tip protruding from an end of the sensor body opposed the bellows;

the sensor body being urged against the interior surface of the boss by spring action of the bellows to position the sensor tip within the tapered opening.

3. The gas turbine engine of claim 2, wherein the bellows is selected to have a range of motion sufficient to maintain contact between the sensor body and the interior surface of the boss during all operating conditions of the gas turbine engine.

4. A gas turbine engine comprising:

a casing;

an opening formed through the casing;

a combustor wall disposed within the casing;

an opening formed through the combustor wall; and a sensor assembly comprising a mounting flange, a bellows connected to the mounting flange, and a sensor element, the mounting flange being removeably attached to the casing across the casing opening to position the sensor element proximate the combustor wall opening, wherein the sensor element further comprises a sensor body element attached to the bellows and biased against the combustor wall.

5. A gas turbine engine comprising:

a casing surrounding a burner assembly for providing a mixture of fuel and air to a combustion chamber defined by a combustor wall disposed within the casing;

an active combustion control system comprising a sensor element for controlling combustion in the combustion chamber;

a sensor assembly comprising the sensor element and an attached bellows and mounting element;

the sensor assembly adapted for insertion of the sensor element through an opening in the casing to position the sensor element proximate an opening in the combustor wall for sensing a parameter in the combustion chamber;

wherein the bellows is compressed from a resting state by contact of the sensor assembly with the combustor wall upon tightening the mounting element against the casing.

6. The gas turbine engine of claim 5, further comprising:

a boss attached to the combustor wall proximate the combustor wall opening, the boss comprising an interior surface defining a tapered opening;

the sensor element further comprising a sensor body and a sensor tip protruding from an end of the sensor body opposed the bellows;

the sensor body biased against the interior surface of the boss to position the sensor tip within the tapered opening.

7. The gas turbine engine of claim 6, wherein the bellows is selected to have a range of motion sufficient to maintain contact between the sensor assembly and the interior surface of the boss during all operating conditions of the gas turbine engine.

8. The gas turbine engine of claim 5, wherein the sensor assembly further comprises a windshield attached to the mounting element and extending at least partially around the sensor element.

9. The gas turbine engine of claim 5, wherein the sensor element further comprises:

a sensor body element attached to the bellows and urged against the combustor wall; and a sensor tip attached to the sensor body element and disposed proximate the combustor wall opening.

10. The gas turbine engine of claim 5, wherein the sensor element comprises a pressure sensor.

11. The gas turbine engine of claim 5, wherein the sensor element comprises one of the group of a pressure sensor, a photo sensor and a gas sensor.

12. A method of operating a gas turbine engine, the method comprising:

providing an active combustion control system for controlling combustion within a gas turbine engine, the active combustion control system comprising a sensor element for measuring a combustion parameter within the gas turbine engine;

providing an opening in a casing of the gas turbine engine;

providing an opening in a combustor of the gas turbine engine;

providing a sensor assembly comprising the sensor element, a mounting flange and a bellows;

inserting the sensor assembly through the casing opening to make contact with the combustor so that the sensor element extends proximate the combustor opening; and urging the mounting flange against the casing to compress the bellows from a resting state to a compressed state to ensure contact between the sensor assembly and the combustor during operation of the gas turbine engine.

13. The method of claim 12, further comprising removing the sensor element from the gas turbine engine by removing the sensor assembly from the casing without further disassembly of the gas turbine engine.

14. The method of claim 12, further comprising selecting the bellows to have a size sufficient to ensure contact between the sensor assembly and the combustor during all stages of operation of the gas turbine engine.

15. The method of claim 12, further comprising:

installing a boss having an interior surface on the combustor to define a tapered combustor opening; and urging the sensor assembly against the interior surface of the boss by bolting a flange of the sensor assembly across the casing opening.

* * * * *